June 25, 1935. E. F. SMITH 2,006,282
TEMPERATURE CONTROL SYSTEM
Filed Dec. 6, 1930
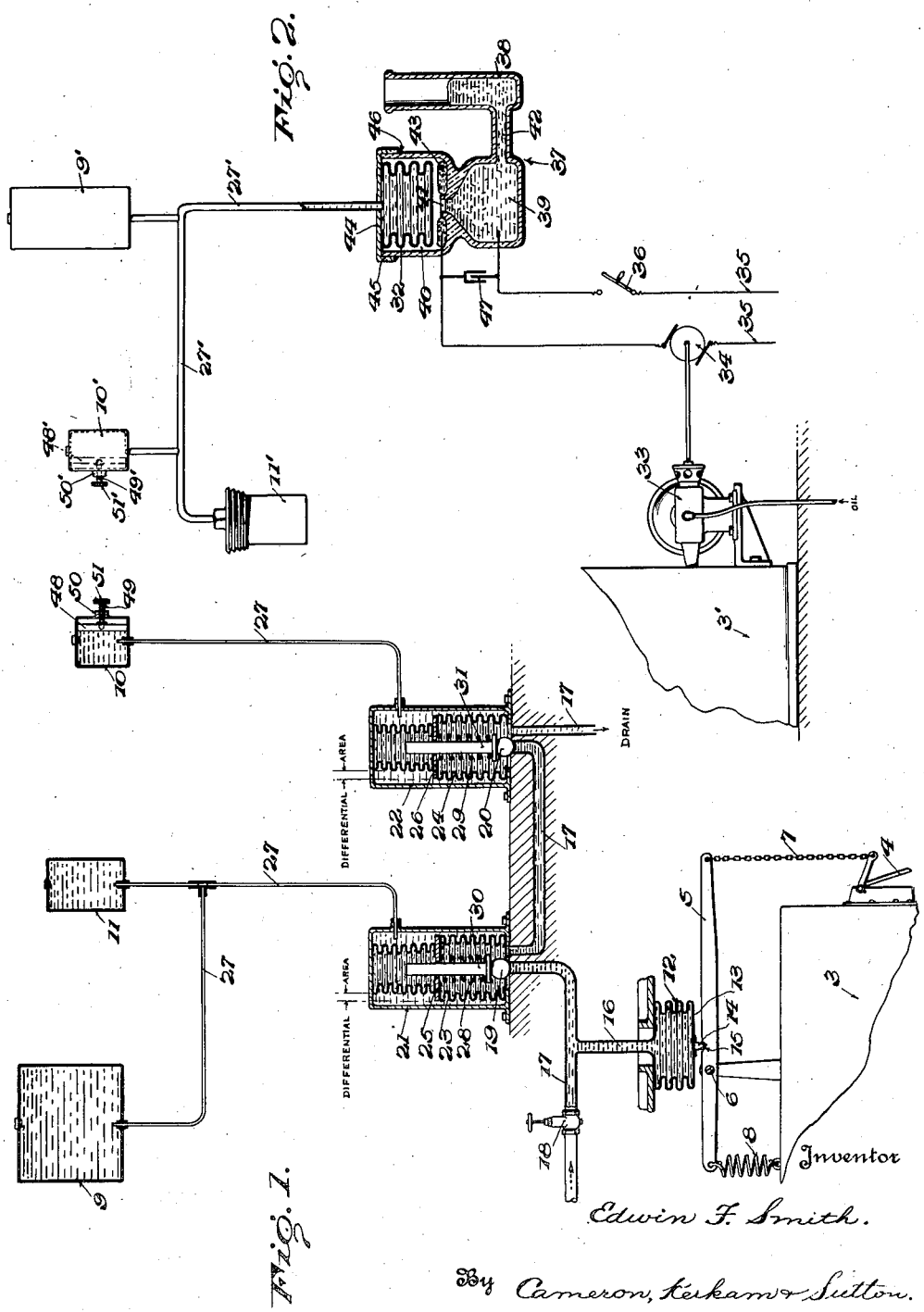
Inventor
Edwin F. Smith.
By Cameron, Kerkam & Sutton.
Attorneys Patented June 25, 1935

2,006,282

UNITED STATES PATENT OFFICE 2,006,282

TEMPERATURE CONTROL SYSTEM

Edwin F. Smith, Prospect Park, Pa., assignor to The Fulton Sylphon Company, Knoxville, Tenn., a corporation of Delaware Application December 6, 1930, Serial No. 500,607

9 Claims. (Cl. 236—91)

This invention relates to temperature responsive control devices, and more particularly to control devices of this character for automatically regulating the operation of heating plants.

It has been heretofore proposed to regulate the opening and closing of dampers and draft doors of furnaces, the starting and stopping of motors for fuel oil burners or blowers, and the flow of current in electrical type heating plants, by means of thermostatic devices responsive to changes in temperature within the enclosure being heated. In heating plants employing a fluid as a heating medium, similar means have also been employed which are responsive to temperature changes in the heating medium itself. It will be understood that wherever the term "fluid" is used throughout the specification and claims, reference is had not only to water and steam but also to air, gas or any other heating medium capable of flow. Still other control systems have utilized thermostats both inside and outside of the enclosure being heated. None of the devices hitherto known, however, is capable of producing the highly efficient operation provided by the present invention because of a failure to recognize that maximum efficiency in the heating of any enclosure depends upon at least three factors, the cumulative result of which is the truest criterion for regulating purposes.

It is therefore one of the objects of the present invention to provide a novel and efficient controlling system for a heating plant, the action of which is dependent upon variations in the cumulative resultant of temperature changes at three different points—within the enclosure being heated, without the enclosure, and in the heating medium itself.

Another object is to provide a device of this character which is simple in construction, inexpensive to manufacture and install, and accurate and highly efficient in operation.

A further object is to provide a temperature responsive regulating system for a heating plant wherein novel flexible bellows means are provided for controlling the heat producing unit of the plant in accordance with variations in temperature at three or more different places.

Still another object is to provide a novel temperature responsive controlling system for a heating plant wherein changes in temperature within the enclosure being heated due to changes in the outside temperature are anticipated and their effect upon the operation of the heating plant is compensated for in advance of their actual occurrence.

A still further object is to provide a novel form of regulating system for a heating plant which is responsive to changes in atmospheric pressure.

Another object is to provide a temperature responsive regulating system for a heating plant the action of which not only is dependent upon variations in temperature changes at a plurality of different points but also is adjusted in accordance with changes in atmospheric pressure.

Another object is to provide an electrical control system embodying a novel form of liquid contact switch which may be actuated from a plurality of different points.

These and other objects will appear more fully from a consideration of the detailed description of the invention which follows. Although only two embodiments of the present invention have been described and illustrated in the accompanying drawing, it is to be expressly understood that this drawing is for the purpose of illustration only and is not to be construed as a definition of the scope of the invention, reference being had for that purpose to the appended claims.

In the drawing, wherein like reference characters indicate like parts throughout the several views:—

Fig. 1 is a diagrammatic representation, with certain parts shown in section, of one embodiment of the present invention utilizing hydraulic pressure as the means for actuating a regulating lever connected to the drafts or dampers of a furnace; and Fig. 2 is a similar representation of a second embodiment of the invention as applied to the electric circuit of an oil burner or blower motor.

Referring now more particularly to Fig. 1, there is shown therein a novel controlling system for a heating plant wherein the dampers or draft doors are regulated by means of novel flexible bellows means in accordance with variations in temperature at three different places—inside the enclosure being heated, outside said enclosure, and in the heating medium itself. As shown, the heating system may be of any suitable type employing a fluid such as hot water as the heating medium, and having a furnace or boiler 3 which is provided with the usual dampers and draft doors, one of which is shown at 4, which are opened and closed by means of a regulating arm or lever 5 pivoted in any suitable manner as at 6. One end of regulating arm 5 is suitably connected as by a chain 7 to the damper or draft door 4, while the other end is connected to the free end of a spring 8 which is anchored in any desired manner to the top of furnace 3.

Suitable temperature responsive devices are located at advantageous positions so that they may be readily affected by the temperatures which it is desired to utilize for controlling purposes. In the embodiment shown, three suitable containers 9, 10 and 11 are employed, container 9 being exposed to the temperature outside of the enclosure to be heated, container 10 being exposed to the temperature within said enclosure, and container 11 being exposed to the temperature of the heating medium. Each of the containers is filled with a thermo-sensitive, expansible fluid of any suitable character, the pressure changes of which in response to temperature variations are utilized in a novel flexible bellows device for regulating the actuation of arm 5 in a manner next to be described.

Intermediate pivot point 6 and the end of regulating arm 5 which is secured to chain 7 there is interposed an expansible, bellows member 12, the movable end wall 13 of which is provided with a projecting member 14 which engages a corresponding notch or slot 15 formed in the upper surface of regulating arm 5. Bellows member 12 is connected at its upper end by means of a suitable pipe or tube 16 to a pipe line 17 which is in turn connected to any suitable fluid supply, such as the water supply line to the enclosure being heated. A normally open needle valve 18 is positioned in pipe line 17 intermediate its connection to the water supply and branch pipe 16, while between the latter and the end of pipe line 17 which leads to the drain there is interposed a pair of spring-loaded valves 19 and 20 which, by their variable resistance to flow, regulate the pressure of the fluid in the pipe line and hence the expansion and contraction of bellows member 12.

The pressures of the spring loading valves 19 and 20 are in turn controlled by a novel flexible bellows arrangement. As shown, valves 19 and 20 are housed within rigid casings 21 and 22 which also contain expansible bellows members 23 and 24. The ends of bellows members 23 and 24 are rigidly secured as by soldering or brazing to the tops and bottoms of casings 21 and 22, and intermediate the ends of said members there are suitably secured annular division plates 25 and 26 separating each bellows into two portions of different diameters, the upper portion being of smaller diameter than the lower portion. Each bellows member 23 and 24 may be conveniently formed as shown of two bellows of different effective diameters with their contiguous ends suitably secured, as by soldering or brazing, to the annular division plates. The valve stems 30 and 31 of valves 19 and 20 project within bellows members 23 and 24, and are guided by the central openings in annular division plates 25 and 26.

The chambers formed between the outsides of bellows members 23 and 24 and the insides of casings 21 and 22 are of variable volume, and are connected by suitable tubing 27 to containers 9, 10 and 11, containers 9 and 11 being connected in parallel with the chamber within casing 21, and container 10 being alone connected to the chamber within casing 22. The thermo-sensitive, expansible liquid previously referred to completely fills not only containers 9, 10 and 11, but also tubing 27 and the expansible chambers formed within casings 21 and 22, and any pressure changes produced in the sealed thermostatic systems thus formed, due to variations in temperature, will be exerted against the differential areas of plates 25 and 26 and move the latter up or down dependent upon whether the pressure decreases or increases. This movement of plates 25 and 26 is utilized to vary the compression of valve springs 28 and 29 which surround valve stems 30 and 31 and exert their thrust against valves 19 and 20.

Valves 19 and 20 are connected in series in pipe line 17, the outlet from the interior of bellows member 23 being connected to the inlet of bellows member 24, and the outlet of the latter being connected to the drain.

The relative volumes of containers 9, 10 and 11, and the initial setting of the valve springs 28 and 29 and needle valve 18, are of course dependent upon the characteristics of the particular heating system involved. There is always a very slow flow of water through pipe line 17 and past valves 19 and 20, the latter being so adjusted that they are never completely closed under operating conditions, and when the temperature conditions affecting containers 9, 10 and 11 are such that the enclosure is being properly and efficiently heated, plates 25 and 26 are retained in their proper position by the pressure of the thermo-sensitive liquid, and through springs 28 and 29 the valves 19 and 20 are so loaded that the pressure and consequent expansion produced in bellows member 12, due to the resistance to flow through pipe line 17 offered by valves 19 and 20, is then sufficient to overcome the compression of spring 8 to a certain degree and to hold or move the draft door 4 to the proper position. When, however, the temperature at any of the three containers decreases, the pressure of the thermo-sensitive liquid in the system tends to decrease and either plate 25 or 26, or both, moves upward, decreasing the pressure of spring 28 or 29, or both, and offering less resistance to flow through pipe line 17. This change in resistance to flow decreases the pressure in bellows member 12 and the downward thrust of projecting member 14 against regulating arm 5, thus allowing spring 8 to swing regulating arm 5 about its pivot 6 and open draft door 4. By placing valves 19 and 20 in series, and by making valve 19 responsive to the cumulative effect or resultant of temperature changes at containers 9 and 11, and by making valve 20 responsive only to temperature changes at container 10, a novel anticipating effect is secured whereby a change in outdoor temperature is immediately effective upon the regulation of the heating plant even though the indoor temperature has not yet been changed.

Referring now to Fig. 2, there is shown therein a second embodiment of the invention as applied to a switch controlling circuit for the motor of a fuel oil burner or blower. As shown, containers 9', 10' and 11' are located similarly to containers 9, 10 and 11 of Fig. 1, but are all three connected to a common expansible thermostatic system comprising tubing 27' and an expansible flexible bellows member 32. Containers 9', 10' and 11', tubing 27' and bellows member 32 are all filled with a suitable thermo-sensitive, expansible liquid as previously described.

The heating system of this second embodiment comprises a furnace 3', and a fuel oil burner or blower 33 of any suitable type which is provided with the usual motor 34 having a pair of electrical leads 35 connected thereto and to any suitable source of power. In addition to a manually operable switch 36, which remains closed at all times except when the heating plant is removed from service, the electrical circuit to motor 34 is also provided with a novel form of liquid contact switch 37 which is adapted to be automatically operated by the resultant variations in temperature at containers 9', 10' and 11', and which is also adapted to automatically regulate the action of the control system in accordance with changes in atmospheric pressure.

Switch 37 comprises a substantially U-shaped container 38 of glass or other suitable material, one leg of which is smaller in diameter than the other and open to the atmosphere at its upper end. The other leg, of larger diameter, has its interior portion divided into two chambers 39 and 40 connected to one another through a constricted opening 41. Lower chamber 39 of the larger leg is connected by a suitable horizontal passageway 42 with the interior of the smaller leg, the spaces thus interconnected being filled with mercury or other suitable conducting liquid which normally stands at a level slightly below the top of restricted opening 41 leading into upper chamber 40 of the larger leg. An annular groove 43 is formed in the bottom of upper chamber 40 surrounding and spaced from constricted opening 41, and is also filled with mercury. One of leads 35 terminates within the annular ring of mercury formed in groove 43 and the other lead terminates within the body of mercury maintained in lower chamber 39. In the normal position of this switch the upper portion of constricted opening 41 is free of mercury and there is thus no electrical circuit between the ends of leads 35.

Bellows member 32 is also housed in upper chamber 40 of the switch, being maintained in position therein by means of a cover 44 which is provided with a flange 45 encircling the top of chamber 40 and hermetically sealed thereto by any suitable means as at 46. The remainder of the interior of chamber 40 not occupied by bellows 32 and the annular ring of mercury is filled with a suitable electrically non-conductive gas or liquid, such as carbon tetrachloride or nitrogen. If carbon tetrachloride is used, a condenser 47 should be placed across leads 35 between switch 37 and motor 34, but if nitrogen is used, this condenser may be omitted.

As long as the temperatures at containers 9', 10' and 11' are such that the enclosure is being maintained at the proper temperature, switch 37 remains in the position shown and the electrical circuit to motor 34 is open, manually operable switch 36 being normally closed. Should the outdoor temperature, to which container 9' is exposed, fall, however, the thermo-sensitive liquid within said container will contract, thereby causing a decrease in volume of the liquid within and a consequent partial collapse of bellows member 32. The gas or liquid within chamber 40 thereupon tends to decrease in pressure, and allows the air pressure on top of the column of mercury in the smaller leg of the switch to force mercury upward from chamber 39, filling opening 41 and establishing an electric circuit therethrough between the two terminals of leads 35. Motor 34 is then started and will be effective to increase the temperature of the source of heat as by operating an oil burner or a blower forcing air under the grate of a coal-burning furnace.

Obviously, under such action, the temperature of the heating medium, to which container 11' is exposed, will be increased. This will cause expansion of the liquid within container 11' and consequent expansion of bellows member 32, increasing the pressure of the gas or liquid in chamber 40, forcing the mercury out of opening 41 and breaking the electric circuit to motor 34. A subsequent drop in temperature at container 9' will re-establish the circuit, the relative volumes of containers 9' and 11' inversely determining the relative changes in temperatures at these points.

It will thus be seen that each change in outdoor temperature at container 9' will necessitate a corresponding but opposite change in temperature of the heating medium to which container 11' is exposed, and that for any given outdoor temperature, limits are at once set for the temperature of the heating medium, so that a rise in temperature will stop motor 34 and a drop in temperature will start it.

Should, for some reason, the change in temperature of the heating medium at container 11' not be such as to maintain a constant temperature within the enclosure at container 10', expansion or contraction of the thermo-sensitive liquid within the latter will occur, thereby calling for a greater or less change at container 11' so as to maintain a substantially constant temperature at container 10'.

The novel construction of switch 37 also provides for an automatic adjustment of the entire control system in accordance with variations in atmospheric pressure. Since leg 38 is open to atmospheric pressure, any change in pressure, when a gas or vapor is used in the chamber 40, makes possible the closing of the switch by a different temperature variation than is required during normal operation. This action, in effect, shifts the level of the basic temperature of the system a degree or two higher or lower dependent upon the atmospheric pressure.

It will be apparent that a similar operation, with the exception of the atmospheric pressure adjustment feature, will be obtained with the device of Fig. 1, the several containers operating cumulatively in both embodiments to maintain the desired temperature in the enclosure, and operating severally as heretofore explained in response to changes at any one of the three containers, thereby anticipating need for a change in the temperature of the heating medium, particularly when changes occur in the outside temperature.

As mentioned above in connection with the description of Fig. 1, the volumes of the containers for the thermosensitive liquid must be proportioned in accordance with the characteristics of the particular heating system used and with the range of temperatures which it is desired to maintain within the enclosure and in the heating medium. It has been found, however, that satisfactory results can be obtained in the heating of an ordinary dwelling house when the ratio of the volumes of containers 9', 10' and 11' is 7.5:1.0:1.5.

If desired, suitable means may also be incorporated in the control system for governing the heat producing unit of the heating plant independently of temperature or barometric variations, as by manual adjustment. For example, containers 10 and 10', those situated within the enclosure being heated, may be provided with any desired means for manually varying their effective capacity, that shown comprising liquid-tight pistons 48 and 48' housed within containers 10 and 10', respectively, and having threaded stems 49 and 49' passing through internally threaded bosses 50 and 50' secured to the containers, and terminating in suitable adjusting handles 51 and 51'. By adjustment of handles 51 and 51' the effective volume or capacity of containers 10 and 10' can be varied at will, thereby actuating the expansible bellows members 24 and 32 independently of any temperature or barometric variations.

There is thus provided by the present invention a novel controlling system for a heating plant which is simple in construction, inexpensive of manufacture, and efficient and reliable in operation. The heating effect of the heating plant is automatically regulated in accordance with the cumulative or resultant variations in temperatures at three different places, and a novel anticipating effect thus obtained which greatly reduces fuel consumption during periods of rapid changes in outdoor temperatures. Novel flexible bellows means are utilized to apply the differential or resultant effect of this plurality of temperatures to the means for regulating the operation of the heating plant, and a novel form of liquid contact switch is provided for any system embodying electrical control means. Means are also provided for automatically regulating the action of the control system in accordance with changes in atmospheric pressure. Not only does the device described automatically control the heating of the enclosure, but it is also capable of manual operation, and will operate as a protective device in that when the temperature of the heating medium attains a predetermined figure, the heating action of the plant is automatically reduced until the temperature of the heating medium returns below the danger point. The invention is applicable to any of the usual types of heating plant employing a fluid heating medium, irrespective of the means employed for generating the heat, and to any type of enclosure which it is desired to heat.

It will be obvious that the invention is not limited to the forms shown in the drawing but is capable of a variety of mechanical embodiments. For example, regulating arm 5 may be employed to actuate a switch for the motor of a fuel oil burner or blower, a valve in the distributing system of the heating medium in place of the draft door shown, or a rheostat in the circuit of an electric heating element associated with the heating medium. Switch 37 may also be adapted to control the circuit of a relay through which passes the current for energizing an electrical heating element. Likewise, any suitable form of container for the expansible fluid, or other forms of electric switch, may be employed in place of those shown. It is also obvious that the invention is not limited to the provision of three containers, since additional ones may be placed at different points within the enclosure or the heating medium, as desired, without changing the mode of operation of the system as a whole. Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. A temperature controlling system of the type adapted for use with a heating plant for enclosures employing a fluid heating medium comprising a container exposed to the temperature without the enclosure to be heated, a second container exposed to the temperature within the enclosure, a third container exposed to the temperature of the heating medium, an expansible fluid within said containers, a pressure responsive device, means connecting the exterior of each of said containers to the interior of said pressure responsive device and directly subjecting the latter to the pressure of said expansible fluid thereby forming a closed thermo-sensitive system with said containers connected in parallel with one another, and means operated by said pressure responsive device for varying the heating effect of said heating plant.

2. A temperature controlling device for heating plants for enclosures employing a fluid heating medium comprising a container exposed to the temperature without the enclosure to be heated, a second container exposed to the temperature within the enclosure, a third container exposed to the temperature of the heating medium, an expansible fluid in said containers, means for varying the heating effect of the heating plant, and means including a bellows device connected to all of said containers and responsive to the resultant of the variations of pressure produced in the expansible fluid for variations in temperature at the various containers for controlling said last named means.

3. In a heating plant for enclosures of the type employing a fluid heating medium, means for controlling the heating effect of said plant comprising a temperature responsive device located without the enclosure to be heated, a second temperature responsive device located within the enclosure, a third temperature responsive device exposed to the temperature of the heating medium, and means including an expansible bellows member operatively connected with the controls of said heating plant for actuating the same, said bellows member being operatively associated with said temperature responsive devices and responsive to the resultant of the variations in temperature at said devices.

4. In combination with a heating plant for enclosures of the type employing a fluid heating medium, a temperature responsive device exposed to the temperature within the enclosure being heated, a second temperature responsive device exposed to the temperature without said enclosure, a third temperature responsive device exposed to the temperature of the heating medium, each of said temperature responsive devices including a fluid the pressure of which varies in response to temperature changes, pressure responsive means operatively associated with said temperature responsive devices and adapted to be moved in proportion to the algebraic resultant of the temperature variations at all three of said devices, and means actuated by the movements of said pressure responsive means for controlling the heating effect of said heating plant.

5. In combination with a heating plant for enclosures of the type employing a fluid heating medium, a temperature responsive device exposed to the temperature within the enclosure being heated, a second temperature responsive device exposed to the temperature without said enclosure, a third temperature responsive device exposed to the temperature of the heating medium, a member with which all of said temperature responsive devices are connected in parallel and which is movable in response to changes in the algebraic resultant of the variations in temperature at said devices, and electrical means actuated by movement of said member for controlling the heating effect of said heating plant.

6. A temperature controlling system of the type adapted for use with a heating plant for enclosures employing a fluid heating medium comprising a container exposed to the temperature within the enclosure being heated, a second container exposed to the temperature without said enclosure, a third container exposed to the temperature of the heating medium, an expansible bellows member, means connecting the interiors of said containers with each other and with the interior of said bellows member and thereby forming a closed system with said containers connected in parallel with one another, a thermo-sensitive fluid completely filling the temperature responsive system thus formed, electrical means controlling the heating effect of the heating plant, and means including said bellows member for actuating said electrical means in response to the algebraic resultant of the variations in temperature at said containers.

7. In combination with a heating plant for enclosures, a plurality of temperature responsive devices located at points exposed to different temperature conditions, an electric switch controlling the heating effect of said heating plant, said switch including a pair of terminals adapted to be connected by a body of conducting fluid, means for controlling the bridging of said terminals by said conducting fluid in response to the resultant of the variations in temperature of said devices, and means for varying the position of said body of conducting fluid relative to said terminals in response to variations in atmospheric pressure.

8. In an electrical control system, a switch comprising a container having two portions connected by a relatively restricted passageway, a pair of electrodes extending into said container, one into each of said portions, an electricity-conducting liquid contained in one of the portions of said container and subject to atmospheric pressure, the other of said portions containing a non-conducting fluid, and means for actuating said switch from a plurality of remote points comprising an expansible bellows member within the portion of said container containing the non-conducting fluid, and means for expanding and contracting said bellows member from a plurality of remote points.

9. A temperature controlling system of the type adapted for use with a heating plant for enclosures employing a fluid medium comprising a container exposed to the temperature within the enclosure being heated, a second container exposed to the temperature without said enclosure, a third container exposed to the temperature of the heating medium, an expansible bellows member, means connecting the interiors of said containers with each other and with the interior of said bellows member and thereby forming a closed system with said containers connected in parallel with one another, a thermo-sensitive fluid completely filling the temperature responsive system thus formed, an electric switch controlling the heating effect of the heating plant, said switch including a pair of terminals adapted to be connected by a movable body of conducting fluid, and means including said bellows member for controlling the bridging of said terminals by effecting movement of said conducting fluid in response to changes in the resultant of the variations in temperature at said containers.

EDWIN F. SMITH.